(12) United States Patent
Kinast

(10) Patent No.: US 10,378,152 B2
(45) Date of Patent: Aug. 13, 2019

(54) ENVIRONMENT-FRIENDLY PACKAGING PAPER FOR FOOD

(71) Applicant: DELFORTGROUP AG, Traun (AT)

(72) Inventor: Hannes Kinast, Eggendorf im Traunkreis (AT)

(73) Assignee: delfortgroup AG, Traun (AT)

( * ) Notice: Subject to any disclaimer, the term of this patent is extended or adjusted under 35 U.S.C. 154(b) by 54 days.

(21) Appl. No.: 15/538,655

(22) PCT Filed: Oct. 12, 2015

(86) PCT No.: PCT/EP2015/073543
§ 371 (c)(1),
(2) Date: Jun. 22, 2017

(87) PCT Pub. No.: WO2016/102094
PCT Pub. Date: Jun. 30, 2016

(65) Prior Publication Data
US 2017/0350074 A1    Dec. 7, 2017

(30) Foreign Application Priority Data

Dec. 23, 2014 (DE) .................. 10 2014 119 572

(51) Int. Cl.
| | | |
|---|---|---|
| *C08L 3/02* | (2006.01) | |
| *B65D 65/42* | (2006.01) | |
| *D21H 17/02* | (2006.01) | |
| *D21H 17/67* | (2006.01) | |
| *D21H 17/68* | (2006.01) | |
| *D21H 19/40* | (2006.01) | |
| *D21H 19/46* | (2006.01) | |
| *D21H 19/54* | (2006.01) | |
| *D21H 19/84* | (2006.01) | |
| *D21H 21/16* | (2006.01) | |
| *D21H 27/10* | (2006.01) | |
| *C09D 191/00* | (2006.01) | |
| *B65D 81/26* | (2006.01) | |
| *D21H 19/56* | (2006.01) | |
| *D21H 19/58* | (2006.01) | |
| *D21H 21/54* | (2006.01) | |
| *C08L 29/04* | (2006.01) | |
| *C08L 33/08* | (2006.01) | |

(52) U.S. Cl.
CPC .............. *D21H 21/16* (2013.01); *B65D 65/42* (2013.01); *B65D 81/263* (2013.01); *C09D 191/00* (2013.01); *D21H 17/02* (2013.01); *D21H 17/675* (2013.01); *D21H 17/68* (2013.01); *D21H 19/40* (2013.01); *D21H 19/46* (2013.01); *D21H 19/54* (2013.01); *D21H 19/56* (2013.01); *D21H 19/58* (2013.01); *D21H 19/84* (2013.01); *D21H 21/54* (2013.01); *D21H 27/10* (2013.01)

(58) Field of Classification Search
CPC ........ D21H 19/40; D21H 19/58; D21H 21/16; D21H 27/10; D21H 21/54; D21H 17/02; D21H 17/675; D21H 17/68; D21H 19/46; D21H 19/54; D21H 19/56; D21H 19/84; D21H 19/44; D21H 19/64; D21H 21/20; B65D 65/42; B65D 81/263; C09D 191/00; C09D 125/08
See application file for complete search history.

(56) References Cited

U.S. PATENT DOCUMENTS

| | | | | |
|---|---|---|---|---|
| 3,963,843 A * | 6/1976 | Hitchmough | .......... | D21H 19/58 427/361 |
| 4,272,569 A * | 6/1981 | Shaw | ............... | G03G 5/101 101/462 |
| 4,304,626 A * | 12/1981 | Shaw | ............... | D21H 21/52 101/453 |
| 5,827,616 A * | 10/1998 | Girard | ................ | D21H 19/08 428/464 |
| 6,071,617 A * | 6/2000 | Wissgott | ............ | C09D 189/00 426/106 |
| 6,379,497 B1 * | 4/2002 | Sandstrom | ............ | B65D 1/265 162/123 |
| 7,189,308 B2 * | 3/2007 | Feit | ................... | D21H 27/10 162/135 |
| 8,859,641 B2 * | 10/2014 | Van Den Abbeele | ... | B01J 13/02 523/201 |
| 2004/0005341 A1 * | 1/2004 | Dixit | ................ | C08L 29/04 424/401 |
| 2004/0131871 A1 * | 7/2004 | Lee | .................. | C08L 77/00 428/481 |
| 2008/0230001 A1 * | 9/2008 | Fugitt | ............... | D21H 23/56 118/258 |
| 2008/0245273 A1 * | 10/2008 | Vyorkka | ............. | C04B 26/02 106/665 |
| 2009/0253828 A1 * | 10/2009 | Van Den Abbeele | ... | B01J 13/02 523/201 |
| 2010/0310883 A1 * | 12/2010 | Brungardt | ............ | D21H 17/46 428/424.8 |
| 2011/0046284 A1 * | 2/2011 | Berube | ................ | C08L 9/08 524/322 |

(Continued)

FOREIGN PATENT DOCUMENTS

| | | | | |
|---|---|---|---|---|
| DE | 102014119572 A1 * | 6/2016 | .......... | C09D 191/00 |
| DE | 102014119572 B4 * | 7/2017 | .......... | C09D 191/00 |

(Continued)

OTHER PUBLICATIONS

International Searching Authority—EPO, International Search Report and Written Opinion, PCT/EP2015/073543; dated Dec. 15, 2015. 10 pages.

*Primary Examiner* — Jose A Fortuna
(74) *Attorney, Agent, or Firm* — Sunstein Kann Murphy & Timbers LLP

(57) ABSTRACT

The objective of the present invention is to provide a packaging paper for food which on the one hand offers a sufficiently high resistance against the penetration of grease, oil, and water and on the other hand can easily be recycled or biologically degraded.

38 Claims, No Drawings

(56) References Cited

U.S. PATENT DOCUMENTS

| | | | |
|---|---|---|---|
| 2011/0244258 A1* | 10/2011 | Vonfelden | C09D 167/02 |
| | | | 428/514 |
| 2012/0302660 A1* | 11/2012 | Stanssens | B32B 33/00 |
| | | | 523/100 |
| 2013/0225744 A1* | 8/2013 | Iyer | C08L 9/08 |
| | | | 524/399 |
| 2015/0259857 A1 | 9/2015 | Yildirim et al. | |
| 2016/0230343 A1* | 8/2016 | Pang | D21H 19/822 |
| 2016/0340833 A1* | 11/2016 | Pang | D21H 27/10 |
| 2017/0350074 A1* | 12/2017 | Kinast | B65D 81/263 |
| 2018/0135252 A1* | 5/2018 | Pang | D21H 19/385 |
| 2018/0245291 A1* | 8/2018 | Pang | D21J 1/08 |
| 2018/0311940 A1* | 11/2018 | Toft | B32B 27/10 |

FOREIGN PATENT DOCUMENTS

| | | | | |
|---|---|---|---|---|
| WO | WO 96/15321 | 5/1996 | | |
| WO | WO 2011/110498 | 9/2001 | | |
| WO | WO-2016102094 A1 * | 6/2016 | | C09D 191/00 |

* cited by examiner

ENVIRONMENT-FRIENDLY PACKAGING PAPER FOR FOOD

CROSS-REFERENCE TO RELATED APPLICATIONS

This Application is a U.S. national stage entry under 35 USC § 371 of PCT/EP2015/073543 filed Oct. 12, 2015, which claims priority to European Patent Application 102014119572.8, filed Dec. 23, 2014; both of which are incorporated herein by reference in their entireties.

FIELD OF THE INVENTION

The invention relates to a paper for packaging of food. In particular it relates to a paper which, by means of a coating of primarily biological origin, has a sufficient resistance against the penetration of grease, oil and water and is still easily recyclable and toxicologically harmless.

BACKGROUND AND PRIOR ART

A packaging paper for food has to fulfill many different and partially contradicting requirements. A first function of the packaging paper is to protect the packaged food from environmental influences. This requires at least a certain mechanical strength and a chemical stability against typical environmental influences. A second function consists in that the packaging paper should also protect the environment from influences by the packaged food, with which it might come into contact. Above all, for food this requires a sufficient resistance against the penetration of grease, oil and water through the packaging paper. Additionally, the packaging paper for food should have a defined resistance against the penetration of water vapor, on the one hand to prevent the food from drying out too quickly and on the other hand, particularly for warm food, to prevent water vapor from condensing inside the packaging and moistening the food.

A further important property is a good printability of the packaging paper, at least on one side, as many packaging papers for food are printed, in order to be able to identify the packaged food and its origin and in order to provide an attractive appearance to the packaged food. This can be done, for example, by flexographic printing, offset printing or roto-gravure printing. It is also important that the packaging paper does not stick to the packaged food and in addition, the packaging paper should lie flat and have pleasant haptics, a high opacity and a good foldability.

As packaging paper for food is often used only once, it is sensible for ecological reasons that the packaging paper can be recycled as easily as possible, or if it is not disposed of properly that at least it can be degraded biologically.

Typically, the requirements of a high or defined resistance against the penetration of grease, oil, water and water vapor and good recyclability or biodegradability contradict each other.

A process known from the prior art for packaging papers to achieve a good resistance against the penetration of grease, oil and water or water vapor, respectively, consists of coating a base paper on one side with polyethylene, for example, in an extrusion process. Because of this coating, such a paper cannot be recycled as waste paper or it can only be recycled with a great deal of effort. Thus, this process does not entirely satisfy the requirement of recyclability or biodegradability.

Another process known from the prior art for packaging papers in order to achieve a very good resistance against the penetration of grease, oil and water consists of coating the paper with specific fluorine-containing substances. In particular polyfluorinated surfactants, and above all fluorotelomer alcohols, $CF_3(CF_2)CH_2CH_2OH$ with n being uneven, have been proved to be suitable for this application. The use of these substances, however, can cause a contamination with perfluorooctanoic acid (PFOA, $C_8HF_{15}O_2$), which accumulates in the human organism and is classified in the REACH (Registration, Evaluation, Authorisation of Chemicals) regulation in force in the EU as a reproductive toxicant, carcinogenic and toxic. For this reason alone, polyfluorinated surfactants are not desirable as a component of a packaging paper and in particular not as component of a packaging paper for food. Additionally, such papers are almost incapable of being recycled.

Many attempts to coat a packaging paper for food with substances of primarily biological origin, so that in addition to good recyclability or biodegradability, a high resistance against the penetration of grease, oil and water could also be achieved, were not successful, because the high resistance against the penetration of grease, oil and water, which coatings with poly-ethylene or the use of polyfluorinated surfactants offer, could not be even approximately obtained.

In other attempts to coat the packaging paper with petroleum-based waxes, a high resistance against the penetration of grease, oil and water could be achieved, but again, the requirement for good recyclability or biodegradability was not fulfilled to a sufficient extent. Furthermore, these waxes are often based on petroleum products and are for this reason alone ecologically disadvantageous.

Therefore, there is still a great need in the industry for an even better combination of these two essential requirements for a packaging paper for food.

SUMMARY OF THE INVENTION

The objective of the present invention is to provide a packaging paper for food which on the one hand offers a sufficiently high resistance against the penetration of grease, oil and water and on the other hand can easily be recycled or biologically degraded.

The packaging paper according to the invention has a basis weight from 20 $g/m^2$ to 40 $g/m^2$, comprises filler at a content of less than 20% by weight, with respect to the weight of the uncoated paper, and on at least one side has a coating which comprises a vegetable oil encapsulated in a polymer, as well as talc and at least one binder, wherein both sides of the finished packaging paper have a Cobb 60 value from 14 $g/m^2$ to 22 $g/m^2$.

Surprisingly, the inventor has found that in spite of the low basis weight of the packaging paper, a coating with a vegetable oil encapsulated in a polymer, as well as talc and at least one binder is sufficient to achieve the required high resistance against the penetration of grease, oil and water, as long as this coating is combined with a base paper with said comparably low filler content and a suitable sizing agent, which manifests itself in said Cobb 60 value. In the paper according to the invention, the low filler content provides a low porosity or dense paper structure, respectively, which is of decisive importance for the desired effect of the packaging paper. The given degree of sizing ensures, among others, that the coating penetrates only to a negligible extent into the pore structure of the paper, but instead is located primarily on the surface of the paper and provides the desired effect there. In addition, this reduces the amount of coating material required.

The packaging paper according to the invention thus uses a coating which consists predominantly of materials of biological origin and facilitates the biodegradation of the used packaging paper. In addition, the packaging paper according to the invention has a comparably low basis weight and this alone reduces the potential amount of waste. At the same time, the packaging paper provides a sufficiently high resistance against the penetration of grease, oil and water and a suitable resistance against water vapor, which is sufficiently high to keep the food "fresh", i.e. avoids an excessively quick drying out, but which is at the same time sufficiently low to partially or completely prevent moistening of the food, above all of warm food. This is facilitated in the context of the invention by designing the base paper in the described manner, especially with respect to the interaction with the coating.

The sizing and the encapsulated vegetable oil thus essentially create a barrier against water and water vapor, while the dense paper structure due to the low filler content and the use of talc as a component of the coating form a sufficient barrier against grease and oil. It is only by means of a combination of all these properties that a sufficient resistance against the penetration of grease, oil and water can be achieved. The coating alone, i.e. on any base paper, is not sufficient to achieve the desired properties.

The basis weight of the packaging paper according to the invention should be at least 20 g/m$^2$ and preferably at least 22 g/m$^2$. Such basis weights for the packaging paper have been shown to be sufficiently high to ensure a sufficient resistance against the penetration of grease, oil and water. Preferably, the basis weight is at least 25 g/m$^2$, particularly preferably at least 27 g/m$^2$.

To limit the use of materials for the packaging paper according to the invention, the basis weight should be at most 40 g/m$^2$, preferably at most 37 g/m$^2$ and particularly preferably at most 35 g/m$^2$. The basis weight of the packaging paper can be determined in accordance with ISO 536.

The water absorption of the packaging paper plays an important role and in order to form a sufficient resistance against liquid water on the one hand, but on the other hand, to form a defined resistance against water vapor, it may not exceed or fall below certain values.

The water absorption is determined by the Cobb 60 value and for the packaging paper according to the invention has to be at least 14 g/m$^2$ for the coated side, preferably at least 16 g/m$^2$ and at most 22 g/m$^2$, preferably at most 20 g/m$^2$. Similarly for the uncoated side of the packaging paper, if present, the Cobb 60 value should be at least 14 g/m$^2$, preferably at least 16 g/m$^2$ and at most 22 g/m$^2$, preferably at most 20 g/m$^2$.

The Cobb 60 value of both sides of the packaging paper can be determined in accordance with ISO 535.

Apart from forming the shell of the capsule itself, the polymer for the encapsulation of the vegetable oil should, provide a suitable physical structure to the shell, so that the water-repellent effect of the oil can also develop through the shell of the capsule. Polymers which contain maleimide groups are preferred, and copolymers with maleimide groups and copolymers of styrene and maleic anhydride derivatives are most particularly preferred.

The packaging paper can be further optimized by suitable selection of the thickness. The importance of the thickness in the context of the invention results from the fact that, at the same porosity of the packaging paper, a high thickness increases the resistance against the penetration of grease, oil and water. Preferably, the thickness of the packaging paper is thus at least 23 µm, preferably at least 25 µm and particularly preferably at least 28 µm.

On the other hand, with a limited amount of material the thickness of the packaging paper cannot be increased indefinitely without the resistance against the penetration of grease, oil and water becoming insufficient due to the increasing porosity. Furthermore, the printability is reduced with a porous paper structure. Thus the thickness of the packaging paper according to the invention should be at most 50 µm, preferably at most 45 µm, particularly preferably at most 40 µm and most particularly preferably at most 35 µm.

The thickness of the packaging paper can be determined for a single sheet in accordance with ISO 534.

To estimate the resistance against the penetration of grease, oil and water, the air permeability of the packaging can be used. The air permeability provides information regarding the pores in the paper and thus should be as low as possible. For the packaging paper according to the invention, the Bendtsen air permeability is selected to be at most 20 ml/min, preferably at most 17 ml/min and particularly preferably at most 15 ml/min.

Although an absolute impermeability to air according to Bendtsen, i.e. a value of 0 ml/min, is advantageous for a high resistance against the penetration of grease, oil and water, in the occasional event that permeability to water vapor is desired, it might be better if the packaging paper were not completely impervious. In preferred embodiments, the Bendtsen air permeability is thus at least 3 ml/min, preferably at least 5 ml/min and particularly preferably at least 7 ml/min.

The Bendtsen air permeability can be determined in accordance with ISO 5636-3.

Apart from the air permeability, the permeability of the paper as regards water vapor could be of importance. On the one hand it should not be too high, to prevent quick drying out of the packaged food, but on the other hand, it should not be too low so that, especially for warm food, moisture condenses inside the packaging and moistens the food. The permeability for water vapor is thus preferably at least 200 g/(m$^2$×24 h), and particularly preferably at least 300 g/(m$^2$×24 h) and most particularly preferably 400 g/(m$^2$×24 h) and/or preferably at most 800 g/(m$^2$×24 h) and particularly preferably at most 700 g/(m$^2$×24 h).

The permeability for water vapor can be determined in accordance with ISO 2528:1995, wherein for the direction of the permeability for water vapor, the value for the transport of water vapor from the side facing the food to the outside of the packaging paper is considered.

The optical properties of the packaging paper according to the invention, particularly the opacity and whiteness are of importance for use as packaging paper for food, as the end consumer also buys food according to optical aspects and, for example, a brownish color of the packaging paper, grease stains on the packaging or increased transparency of the packaging paper could be interpreted as an indication of old or spoilt food.

Thus, the opacity of the packaging paper should in principle be as high as possible, but this is hard to achieve due to the low basis weight and the low filler content and, for example, requires the use of special fillers such as titanium dioxide. The opacity of the packaging paper according to the invention should be at least 50% and preferably at least 60%.

On the other hand, the opacity of the paper can be comparably easily increased by printing onto the paper, for which reason it might be more efficient not to spend much effort on increasing opacity. In preferred embodiments of the packaging paper, the opacity is thus at most 90%, preferably at most 80% and particularly preferably at most 70%.

The opacity can be determined in accordance with ISO 2471:2008.

In many applications, apart from the opacity, the whiteness is also of importance for the packaging paper, in order to reproduce colors with high quality during printing of the packaging paper. The whiteness of the packaging paper should thus in principle be as high as possible, but as is the case with opacity, this is hard to achieve with a paper with a low basis weight and a low filler content according to the invention. In preferred embodiments the whiteness of the packaging paper is at least 70% and preferably at least 80%.

The upper limit for the whiteness also arises from economic considerations as, for example, a lack of whiteness of the packaging paper can be corrected by a full-surface printing in a white color. The whiteness of the packaging paper is thus preferably at most 95%, particularly preferably at most 90% and in particular at most 85%.

The whiteness can be determined in accordance with ISO 2470-1:2009. The values refer to that side of the packaging paper which is to be printed or, if the packaging paper is not to be printed or is printed on both sides, to that side which is on the outside when the food is wrapped in the packaging paper.

Preferably, the packaging paper has a tensile strength of at least 1 kN/m, preferably at least 1.3 kN/m and in particular at least 1.5 kN/m. Such a mechanical strength is advantageous both as regards further use and for printing on conventional printing machines.

The tensile strength can be increased by refining the pulp from which the packaging paper according to the invention is produced more intensely. But this also means a considerable consumption of energy, for which reason the tensile strength in preferred embodiments should be at most 5 kN/m, preferably at most 4 kN/m and particularly preferably at most 3 kN/m. The term tensile strength as used here means the tensile strength in the machine direction of the packaging paper and it can be determined in accordance with ISO 1924-2.

The packaging paper according to the invention comprises a base paper and a coating, which is applied to at least one side of the packaging paper.

The base paper comprises pulp, preferably wood pulp, which accounts for at least 60% by weight with respect to the weight of the base paper. Preferably, the proportion of pulp is selected so as to be high, i.e. at least 80% by weight, particularly preferably at least 90% by weight and preferably at most 100% by weight and particularly preferably at most 95% by weight, each with respect to the weight of the base paper.

Wood pulp can be a long fiber pulp, preferably from spruce, pine or larch wood or a short fiber pulp, preferably from beech wood, birch wood or eucalyptus wood.

While long fiber pulp primarily provides tensile strength to the base paper, short fiber pulp serves to increase the volume of the base paper. Refining the pulp, as is known from the prior art, before paper production on the paper machine, requires more energy for long fiber pulp than for short fiber pulp.

For these reasons preferably a mixture of long fiber pulp and short fiber pulp is used as the wood pulp for the base paper of the packaging paper according to the invention. A mixture of long fiber pulp and short fiber pulp in a mass ratio from 2:1 to 1:2 is particularly preferred.

Alternative pulps, for example, pulp from flax, hemp, sisal or aback can partially or completely replace the wood pulp if the packaging paper according to the invention is to have special properties, in particular an especially high tensile strength.

In some embodiments the pulp is bleached to provide sufficient whiteness to the paper. For ecological reasons, it is advantageous to replace part or all of the pulp with unbleached pulp. This further increases the already extraordinary environmental friendliness of the packaging paper according to the invention. In this case, the base paper has a light-brown to dark-brown color.

Pure pulp ("virgin pulp") is in general preferred in order to achieve sufficient tensile strength and to avoid the danger of contamination of the packaging paper by foreign substances. Such substances can be present in recycled fibers, for example, which are therefore not preferred. In addition, because it comes into contact with food, the use of waste paper generally has to be advised against.

Preferably, the Schopper-Riegler degree of refining of the pulp is at least 50°, preferably at least 55° and particularly preferably at least 60°. Such a high degree of refining is beneficial to the density of the paper structure and thus also to the resistance against the penetration of grease, oil and water, and also for other properties such as the tensile strength. However, because refining is associated with a high energy consumption, the degree of refining is preferably at most 80°, particularly preferably at most 75° and in particular at most 70°.

The Schopper-Riegler degree of refining can be measured in accordance with ISO 5267.

The base paper can contain fillers. The fillers serve to increase the whiteness and opacity, improve the printability of the paper and reduce the costs for the base paper. While for these reasons a filler content that is as high as possible is generally sought, the filler content should be rather lower for the base paper of the packaging paper according to the invention. According to the invention, the high resistance against the penetration of grease, oil and water is only obtained for the coating according to the invention because the base paper is sufficiently dense, i.e. of low porosity. Because a higher filler content regularly leads to an increased porosity, the filler content of the base paper should in all cases be less than 20% by weight, preferably less than 15% by weight and particularly preferably less than 10% by weight, each with respect to the weight of the base paper.

In principle, the base paper can be produced without filler. Having regard to a sufficient opacity of the packaging paper, however, the filler content is preferably selected to be at least 2% by weight and particularly preferably to be at least 5% by weight with respect to the weight of the base paper.

In principle, any of the fillers known in the prior art for paper production can be used. The fillers can comprise silicates, carbonates and oxides, particularly carbonates and oxides of metals. For the purposes of the invention, calcium carbonate, particularly precipitated calcium carbonate, aluminum hydroxide, talc, kaolin and titanium dioxide are suitable.

Titanium dioxide is preferred for the base paper of the packaging paper according to the invention because it contributes to a particularly high whiteness and opacity of the base paper and is effective even in low amounts. This is important, because there are also high optical requirements for packaging papers for food, but for the aforementioned reasons, the filler content has to be comparably low.

Talc is also a preferred filler for the base paper of the packaging paper according to the invention because it has grease-repellent properties and this enhances the effect of the applied coating.

A further preferred filler for the base paper is kaolin because its flaky shape increases the length of the pores in the paper and hence the pathway for grease, oil and water through the paper and increases the resistance against penetration of the paper.

In order to obtain the degree of sizing of the finished packaging paper, the base paper can contain sizing agents. In this regard, sizes, resins or polymers such as copolymers of styrene and acrylic esters or alkyl-ketene dimers (AKD) or alkylated succinic anhydride (ASA) can in particular be considered. Alkyl-ketene dimers are most particularly preferably.

The sizing can be carried out in the bulk or on the surface, preferably in the bulk.

Based on his knowledge the skilled person can easily select further substances and process aids known from the prior art, for example starch, retention aids, de-foaming agents, dispersing agents and other substances that are useful or required for the production of the base paper. Generally, it has to be considered that the base paper comes into contact with food and thus legal requirements usually have to be complied with.

The use of pigments such as red, yellow or black iron oxides, or carbon, is also possible in order to provide a specific color to the base paper. Similarly, organic dyes can be used, as long as they are approved for contact with food. White base papers, however, are preferred.

Furthermore, the use of flavoring in the base paper is possible. Frequently, however, they are not desired in connection with use as packaging paper for food, because they can influence the smell and the taste of the packaged food and they are in any case not preferred for the packaging paper according to the invention.

Coating the base paper is of essential importance, because, together with the dense structure of the base paper, it serves to achieve a sufficient resistance against penetration of grease, oil and water through the packaging paper.

In preferred embodiments, the coating applied to the base paper amounts to at least 0.5 g/m$^2$, preferably to at least 1 g/m$^2$ and particularly preferably to at least 2 g/m$^2$ of the basis weight of the packaging paper according to the invention, in order to achieve a sufficient resistance against the penetration of grease, oil and water.

In preferred embodiments, the coating applied to the base paper amounts to at most 12 g/m$^2$, preferably to at most 8 g/m$^2$, particularly preferably to at most 6 g/m$^2$ and most particularly preferably to at most 5 g/m$^2$ of the basis weight of the packaging paper according to the invention. Applying too large a quantity of material improves the resistance against the penetration of grease, oil and water only marginally, but increases the cost of the packaging paper. In addition, applying large amounts of a coating composition onto relatively thin papers is generally difficult, in particular with aqueous coating solutions.

The coating can be applied to the base paper on one side or on both sides. Although applying to both sides results in a higher resistance against the penetration of grease, oil and water, it is often not required, and so it can be avoided for economic reasons. In addition, the coating according to the invention can substantially deteriorate the printability on the coated side. Thus, the packaging paper according to the invention is preferably only coated on one side.

In general for a one-sided coating, each of the two sides of the base paper can be coated with the coating according to the invention, but preferably, the side of the paper which faces the food wrapped in the packaging paper is the coated side.

Because the felt side of the base paper is generally smoother and because a greater smoothness results in a uniform coating and thus a greater resistance against the penetration of grease, oil and water, in a preferred embodiment, the felt side of the base paper is coated.

On the other hand, packaging papers are often printed on one side. As the felt side of the packaging paper is more suitable for printing because of the higher print quality, as an alternative, the wire side of the packaging paper can be coated with the coating according to the invention, if this means that a sufficient resistance against the penetration of grease, oil and water can be achieved.

The terms "felt side" and "wire side" should be understood from the viewpoint of paper production. The wire side is that side of the paper that is in contact with the wire during paper production on a paper machine and thus often has a lower smoothness and lower content of filler. The felt side is the side opposite to the wire side and is often smoother and therefore more suitable for printing.

The coating can be applied in one step or in several steps. Application in several steps is preferred, if the amount of applied coating material exceeds about 8 g/m$^2$, depending on the basis weight of the base paper. After each application step, the packaging paper can be dried.

In a preferred embodiment, the base paper is coated with the coating according to the invention on only one side and the other side is coated with starch. This starch coating improves the printability and prevents the paper from curling after drying, which is desirable for further processing of the packaging paper. When coating with starch, starch solutions and processes from the prior art can be used. In the context of the invention, application in a film press is particularly advantageous.

The amount of starch that can be applied to the side of the packaging paper that is not coated according to the invention can preferably be at least 0.5 g/m$^2$, particularly preferably at least 1 g/m$^2$ and preferably at most 4 g/m$^2$, particularly preferably at most 3 g/m$^2$.

The coating solution that is applied to the base paper in accordance with the invention comprises a solvent and the coating material.

The term "solvent" or "coating solution" as used here does not mean that the coating solution has to be a solution in the chemical sense. The coating solution may also be a solution, dispersion, suspension, emulsion or any other form of mixture.

Water is preferred as a solvent over all other solvents or mixtures of solvents and in particular over organic solvents, as it is toxicologically harmless and can be used on the paper machine without further measures, in particular without protection against explosion. It is inevitable that small residues of solvent remain in the paper and can influence the smell and the taste of the packaged food. For this reason too, organic solvents are not preferred.

However, since other solvents or mixtures of solvents apart from water can in principle be used with appropriate measures, they are also encompassed by the invention. In particular, the use of a mixture of water and ethanol as solvent could be considered.

The coating material should be at least 30% by weight, preferably at least 40% by weight, particularly preferably at least 50% by weight and most particularly preferably at least 60% by weight, with respect to the weight of the coating solution. This ensures that the amount of coating solution that needs to be applied in order to apply a pre-defined amount of coating material is not too large, which can in general be difficult for thin papers, in particular for aqueous coating solutions.

The coating material should make up at most 80% by weight, preferably at most 75% by weight and particularly preferably at most 70% by weight, with respect to the weight of the coating solution. This avoids having too little solvent in the coating solution with a correspondingly high viscosity of the coating solution, and the coating solution can thus be applied efficiently to the base paper.

The coating material used in the context of the invention contains a vegetable oil, wherein various vegetable oils, such as sunflower oil, soybean oil, palm oil or rapeseed oil, are preferably considered.

Sunflower oil and soybean oil or a mixture thereof are preferred, and a mixture of sunflower oil and soybean oil in a mass ratio of 1:1 is most particularly preferred.

The sum of the vegetable oils in the coating material should preferably be at least 20%, particularly preferably at least 25% and most particularly preferably at least 30% of the mass of the coating material. The sum of the vegetable oils in the coating materials should preferably be at most 60%, particularly preferably at most 55% and most particularly preferably at most 50% of the mass of the coating material.

As mentioned above, the vegetable oil is encapsulated in a polymer, for example in a copolymer of styrene and maleic anhydride derivatives. These capsules can be produced, for example, according to the process described in WO 2008/014903.

The binder in the coating material can be a starch, a starch derivative, a cellulose derivative or a polymer, in particular polyvinyl alcohol or polystyrene acrylate. Starch, polyvinyl alcohol or a mixture thereof is preferred as the binder, and a mixture of starch, polyvinyl alcohol and polystyrene acrylate in a mass ratio of about 4:3:8 is most particularly preferred as the binder.

The sum of the binders in the coating material should preferably be at least 15%, particularly preferably at least 20% and most particularly preferably at least 25% of the mass of the coating material. The sum of the binders in the coating material should preferably be at most 75%, particularly preferably at most 60% and in particular at most 50% of the mass of the coating material.

The coating material contains at least talc as a filler because of its grease-repellent properties, but it can contain further fillers. These further fillers can primarily serve to increase the opacity and whiteness of the packaging paper. In principle, all fillers can be considered as further fillers, which can also be used for the production of the base paper, in particular silicates, carbonates and oxides, especially calcium carbonate, in particular precipitated calcium carbonate, aluminum hydroxide, kaolin and titanium dioxide. Titanium dioxide is preferred because it results in a high whiteness and opacity, and kaolin is preferred because its flaky shape extends the diffusion pathways through the coating. A mixture of talc, titanium dioxide and kaolin is particularly preferred, most particularly preferably in a mass ratio of talc:titanium dioxide:kaolin of about 16:2:7.

The proportion of talc in the coating material is preferably at least 5%, particularly preferably at least 10% and/or preferably at most 30% and particularly preferably at most 25% with respect to the mass of coating material.

The sum of fillers, including talc, in the coating material is preferably at least 5% by weight, particularly preferably at least 10% by weight and most particularly preferably at least 20% by weight of the mass of the coating material. The sum of fillers in the coating material should be at most 60% by weight, preferably at most 50% by weight and particularly preferably at most 45% by weight with respect to the mass of the coating material.

The coating material can contain waxes. Waxes improve the resistance against the penetration of grease, oil and water, but deteriorate the biodegradability, for which reason their content in the coating material should be less than 5% by weight and preferably less than 2% by weight with respect to the weight of the coating material. The waxes can, for example, be paraffin waxes.

The coating material can comprise further substances which, for example, contribute to the processability of the coating material, or which influence the viscosity or storage life, as long as they do not significantly deteriorate the resistance against the penetration of grease, oil and water and the biodegradability. These substances can be polymer salts.

The sum of further substances in the coating material is preferably less than 15%, particularly preferably less than 10% and most particularly preferably less than 7% of the mass of the coating material.

Preferably, the coating material consists of at least 50% by weight, preferably at least 60% by weight and particularly preferably at least 70% by weight of materials of biological origin. The group of materials of biological origin comprises, for example, vegetable oils, starch and fillers, while petroleum-based waxes and petroleum-based polymers are not included therein.

The production of the base paper can be carried out in accordance with processes known from the prior art. In particular, a paper machine can be used for the production of the base paper, which in accordance with the prior art comprises a head box, a wire section, a press section, a drying section and a winding roll.

At the head box an aqueous suspension of pulp and optionally of filler and other substances, such as process aids, is applied to the wire of the paper machine and at first de-watered by gravity and low pressure in the wire section. Then the press section follows, in which the paper web is further de-watered by mechanical pressure. The remaining water is then evaporated in the drying section, so that the packaging paper reaches its equilibrium moisture content under normal conditions (23° C., 50% rH) of about 4-7% by weight. Winding is carried out at the end of the paper machine.

Frequently, in a paper machine a film or size press is incorporated into the drying section, in which the paper is impregnated or a coating is applied. In particular, a film press offers the possibility of applying two different coating solutions on each side of the paper in a single step. The coating solution according to the invention can preferably be applied in such a film press and is easily possible for a skilled person.

Apart from the film or size press, which allows application directly in the paper machine, applying the coating solution on a separate application device can be considered. The application device can be, for example, a printing machine, in particular a roto-gravure printing machine or flexographic printing machine. Such an application device can also be incorporated into the paper machine instead of or as complement to the film or size press.

Clearly, the paper has to be dried after applying the coating according to the invention in order to obtain the packaging paper according to the invention.

It has been shown that the packaging paper according to one of the preceding embodiments can combine a high resistance against the penetration of grease, oil and water with an excellent biodegradability in a manner not known before. The inventor's experiments have shown that packaging papers according to an embodiment of the invention are comparable to a packaging paper that is coated with polyethylene having regard to the resistance against the penetration of grease, oil and water in particular for comparably short time periods of a few minutes up to half an hour, but at the same time avoid its disadvantages. In that respect, the packaging paper according to the invention is extraordinarily well suited particularly for fast-food articles, which are usually consumed shortly after being packaged.

The packaging paper according to the invention is most particularly advantageous for hot fast food, for example, hamburgers, as it delays the penetration of grease, oil and water not only for a sufficiently long time, but at the same time is sufficiently permeable for water vapor, so that the fast food article is not moistened and does not become "soggy". In this respect, the packaging paper according to the invention is in fact superior to conventional packaging papers, which are coated with polyethylene. In the present disclosure, the term "hamburger" should be understood to mean all related types of sandwiches, in particular cheeseburgers, hot chicken sandwiches, hot fish sandwiches, meat loaf rolls and meat ball rolls.

DESCRIPTION OF THE PREFERRED EMBODIMENT

The advantages of the invention will be demonstrated by an exemplary packaging paper for food according to the invention.

The base paper for the packaging paper according to the invention was produced from the following components.

As long fiber pulp 48% by weight was used consisting of a mixture of pulps from spruce wood, pine wood and larch wood, and as short fiber pulp 44% by weight consisting of a mixture of pulps from birch wood and eucalyptus wood was used, so that the proportion of pulp in the base paper was 92% by weight. Only titanium dioxide was used as the filler, in a proportion of 7.5% by weight. The rest was attributable to other substances and process aids, in particular a small amount of an alkyl-ketene dimer in the bulk to achieve the desired degree of sizing.

All values above given as a % by weight refer to the base paper without coating.

Before the paper production, the pulp was refined to a Schopper-Riegler degree of refining of 60° to 70°, measured in accordance with ISO 5267.

The base paper was produced on a Fourdrinier paper machine using processes known from the prior art. In the film press of the paper machine, the coating solution was applied to the felt side of the base paper and a starch solution was applied to the wire side, and the paper was then dried to a moisture content of 5% by weight with respect to the weight of the finished packaging paper.

The coating solution consisted of 36% by weight of water and 64% by weight of coating material, each with respect to the weight of the coating solution.

The coating material itself contained about 18% sunflower oil, 18% soybean oil, encapsulated in a copolymer of styrene and maleic anhydride derivatives, as well as 7% polyvinyl alcohol, 5% starch and 14% polystyrene acrylate. The fillers were 20% talc, 2.5% titanium dioxide and 9% kaolin. Furthermore, the coating material contained 2% of waxes and about 4.5% of process aids such as dispersing agents. Thus, the coating solution contained more than 70% of materials of biological origin.

All values are with respect to the mass of the coating material.

The basis weight of the finished packaging paper (29.5 g/m$^2$) and of the uncoated base paper (25 g/m$^2$) were determined in accordance with ISO 536, and by difference from the basis weight, the applied amount of the coatings was 4.5 g/m$^2$, wherein it is known from experience that the amount of starch applied to the wire side is about 1 g/m$^2$. Thus, the amount of coating material applied to the felt side was about 3.5 g/m$^2$.

The water absorption was determined by the Cobb 60 value in accordance with ISO 535 for both sides of the packaging paper. For the side coated according to the invention, a value of 17 g/m$^2$ was found, while for the side coated with starch the value was 18 g/m$^2$.

The thickness of the packaging paper was measured on a single sheet in accordance with ISO 534 and a value of 31 μm was obtained.

The Bendtsen air permeability of the packaging paper was measured in accordance with ISO 5636-3 and a value of 9 ml/min was obtained.

The permeability for water vapor was measured in accordance with ISO 2528:1995 in the direction from the side coated according to the invention to the side coated with starch and a value of about 500 g/(m$^2$×24 h) was obtained.

The opacity of the packaging paper was measured in accordance with ISO 2471:2008 and a value of 65% was obtained.

The whiteness of the packaging paper was measured on the wire side in accordance with ISO 2470-1:2009 and a value of 83% was obtained.

The tensile strength of the packaging paper was measured in accordance with ISO 1924-2 and a value of 2.0 kN/m was obtained.

Finally the biodegradability was measured in accordance with EN 13432 "Requirements for packaging recoverable through composting and biodegradation—Test scheme and evaluation criteria for the final acceptance of packaging". In this test the packaging is stored in a defined compost and a sample is taken at regular intervals. For this sample in the proportion as a % by weight is determined which is retained by a sieve with a mesh size of 2 mm. The packaging fulfills the requirements of the standard if less than 10% by weight of the sample mass is retained in the sieve after 12 weeks.

For the packaging paper according to the invention it was shown, that even after two weeks less than 0.1% by weight of the sample mass was retained in a sieve with a mesh size of 2 mm, so that it has an excellent biodegradability.

In order to test the resistance against the penetration of grease, oil and water in an experiment, various foodstuffs were wrapped in the packaging paper according to the invention and in a paper coated with polyethylene. After a defined time period, stains and discoloration of the packaging paper according to the invention were subjectively compared with those on the paper coated with polyethylene. It was shown that over a period of a few minutes up to half an hour, both papers provided an approximately similarly effective barrier against the penetration of grease, oil and water. Over longer periods of time, typically of more than an hour, the paper coated with polyethylene was superior with respect to its barrier effect. The packaging paper according to the invention is therefore preferred for packaging food intended for quick consumption, preferably for food in the area of fast food and most particularly preferred for hamburgers, cheeseburgers or sandwiches.

The paper according to the invention thus at least in the short term forms a good barrier against the penetration of grease, oil and water and has an excellent biodegradability and can thus combine these two contradicting requirements very well.

The invention claimed is:

1. Packaging paper for food
with a basis weight between 20 g/m² and 40 g/m², and
with a filler content of less than 20% by weight with respect to the weight of the uncoated paper,
wherein the packaging paper has a coating on at least one side, which comprises a vegetable oil encapsulated in a polymer, a filler material including talc and a binder, wherein the sum of fillers, in the coating material is at least 5% and at most 50%, and
wherein both sides of the finished packaging paper have a Cobb 60 value of 14 g/m² to 22 g/m².

2. Packaging paper for food according to claim 1, in which said basis weight is at least 25 g/m².

3. Packaging paper for food according to claim 1, in which said basis weight is at most 35 g/m².

4. Packaging paper for food according to claim 1, in which said Cobb 60 value is at least 16 g/m² and at most 20 g/m².

5. Packaging paper for food according to claim 1, in which the polymer contains a maleimide group and is formed by a copolymer of styrene and maleic anhydride derivatives.

6. Packaging paper for food according to claim 1, wherein the thickness is at least 23 μm and wherein the thickness is at most 50 μm.

7. Packaging paper for food according to claim 1, in which the Bendtsen air permeability is at most 20 ml/min and in which the Bendtsen air permeability is at least 3 ml/min.

8. Packaging paper for food according to claim 7, in which the Bendtsen air permeability is at most 15 ml/min and at least 7 ml/min.

9. Packaging paper for food according to claim 1, which has, in at least one direction, a permeability for water vapor in accordance with ISO 2528:1995 of at least 200 g/(m²×24 h) and of at most 800 g/(m²×24 h).

10. Packaging paper for food according to claim 9, wherein the direction corresponds to a transport of water vapor from one side which faces the food when the food is packaged to the outside of the packaging.

11. Packaging paper for food according to claim 1, wherein the opacity in accordance with ISO 2471:2008 is at least 60% and at most 90%.

12. Packaging paper for food according to claim 1, in which the brightness in accordance with ISO 2470-1:2009 of the side facing away from the food during use or of a side to be printed is at least 80% and at most 90%.

13. Packaging paper for food according to claim 1, which has a tensile strength of at least 1 kN/m and a tensile strength of at most 5 kN/m.

14. Packaging paper for food according to claim 1, in which the base paper has a pulp content of at least 90% by weight, with respect to the mass of the base paper, whereby the content does not exceed 95% by weight with respect to the mass of the base paper.

15. Packaging paper for food according to claim 14, in which the pulp is a wood pulp which is formed by a mixture of long fiber pulp and short fiber pulp, wherein;
the long fiber pulp is selected from the group consisting of spruce wood, pine wood or larch wood and mixture thereof; and the
the short fiber pulp is selected from the group consisting of from beech wood, birch wood or eucalyptus wood and mixture thereof; and wherein the mass ratio of the of long fiber pulp to the short fiber pulp is in the range between of 2:1 to 1:2.

16. Packaging paper for food according to claim 14, in which the pulp is unbleached.

17. Packaging paper for food according to claim 14, in which the pulp is formed by pure pulp ("virgin pulp").

18. Packaging paper for food according to claim 14, in which the Schopper-Riegler degree of refining of the pulp is at least 50° and at most 80°.

19. Packaging paper for food according to claim 1, in which the base paper contains a filler, the content of which is less than 10% by weight with respect to the weight of the base paper.

20. Packaging paper for food according to claim 1, in which the filler is talc, kaolin, titanium dioxide, or a mixture thereof.

21. Packaging paper for food according to claim 1, in which the coating makes up a proportion of the basis weight of the packaging paper which is at least 0.5 g/m², and at most 8 g/m².

22. Packaging paper for food according to claim 1, in which both sides of the base paper are coated with said coating, or in which only that side is coated with said coating, which is intended to face the packaged food during use.

23. Packaging paper for food according to claim 22, in which only the felt side of the base paper is coated with said coating.

24. Packaging paper for food according to claim 22, in which only the wire side of the paper is coated with said coating and the felt side of the paper is printed.

25. Packaging paper for food according to claim 1, in which the base paper is coated with said coating on only one side and the other side is coated with starch.

26. Packaging paper for food according to claim 25, in which the amount of starch is at least 0.5 g/m², and at most 4 g/m².

27. Packaging paper for food according to claim 1, in which said vegetable oil at least partially contains sunflower oil, soybean oil, palm oil or rapeseed oil.

28. Packaging paper for food according to claim 27, in which said vegetable oil contains a mixture of sunflower oil and soybean oil in a mass ratio of about 1:1.

29. Packaging paper for food according to claim 1, in which the sum of vegetable oils in the coating material is at least 20% of the mass of the coating material and at most 60% of the mass of the coating material.

30. Packaging paper for food according to claim 1, in which the binder for the coating material contains a starch, a starch derivative, a cellulose derivative, polyvinyl alcohol or polystyrene acrylate.

31. Packaging paper for food according to claim 30, in which the binder contains a mixture of starch, polyvinyl alcohol and polystyrene acrylate, wherein the proportion of polystyrene acrylate exceeds that of the starch and the polyvinyl alcohol.

32. Packaging paper for food according to claim 30, in which the sum of all binders in the coating material makes up at least 15% and at most 75%, of the mass of the coating material.

33. Packaging paper for food according to claim 1, in which the coating material further contains a filler which comprises a mixture of talc, titanium dioxide and kaolin, wherein the proportion of talc exceeds that of titanium dioxide and kaolin.

34. Packaging paper for food according to claim 33, in which the sum of the fillers in the coating material is at least 10% by weight and at most 50% by weight with respect to the mass of the coating material.

35. Packaging paper for food according to claim 1, in which the proportion of talc comprises at least 5% by weight and at most 25% by weight with respect to the mass of coating material.

36. Packaging paper for food according to claim 1, in which the coating material contains less than 2% by weight of wax with respect to the weight of the coating material.

37. Packaging paper for food according to claim 1, in which the coating material consists of at least 70% by weight of materials of biological origin.

38. A method of packaging hot or cold fast food using the packaging paper of claim 1, comprising;
   wrapping the hot or cold fast food with the packaging paper.

* * * * *